Jan. 22, 1957  J. G. IMPARATO  2,778,083
DRUM RING CLAMPS
Filed Oct. 23, 1953

INVENTOR
JACK G. IMPARATO
BY
ATTORNEY

United States Patent Office 2,778,083
Patented Jan. 22, 1957

2,778,083

DRUM RING CLAMPS

Jack G. Imparato, Brooklyn, N. Y., assignor of one-half to John J. Imparato, Brooklyn, N. Y.

Application October 23, 1953, Serial No. 387,851

4 Claims. (Cl. 24—263)

This invention relates to clamp devices for securing drums used in the shipment of various types of fluid materials so as to securely hold drums in a nested arrangement one with respect to the other to prevent relative shifting and the shifting as a whole on any type of conveyance on which they may be carried, such for example as on board ships, trucks, railway cars and the like. More particularly, the invention deals with a clamp device employing a cam-like wedging element for firmly moving a pair of clamp plates into clamping engagement with the rings of a pair of drums and in retaining the same in clamped engagement.

Still more particularly, the invention deals with a clamp of the character described in the form of a unitary construction, that is to say, where the several parts of the clamp, with the exception of an operating handle or rod, are maintained in assembled relationship with each other.

The novel features of the invention will be best understood from the following description, when taken together with the accompanying drawing, in which certain embodiments of the invention are disclosed and, in which, the separate parts are designated by suitable reference characters in each of the views and, in which.

My invention deals with clamps of the general type and kind as disclosed in my prior Patent Number 2,629,910 and is used for coupling drums, or the ring portions of drums, so as to secure drums against relative movement one with respect to the other. In the patent, a full clamp is disclosed, that is to say, a clamp having two V-shaped and integrally united end portions.

Figure 3:
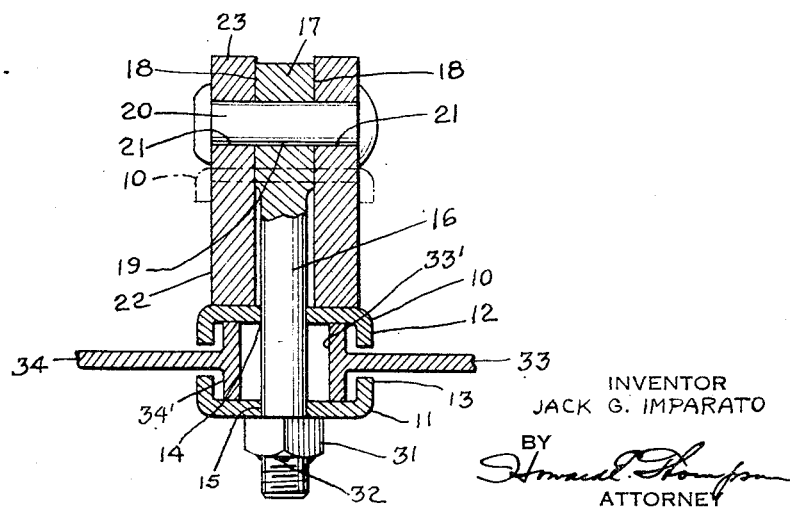
Fig. 3 is a section on the line 3—3 of Fig. 2 also illustrating in dotted lines the spacing of the clamp plates when the clamp is in opened position.

With the present construction, I employ what might be termed a half clamp, comprising top and bottom sheet metal plates 10 and 11 which are slightly V-shaped in form and of channel cross-sectional contour, in other words, include the side flanges, as at 12 and 13, respectively, note Fig. 3. The channel of said plates extends between said flanges, or in other words, the major portion of the width of the plates.

The plates 10 and 11 have substantially centrally thereof, but preferably closer to the wide end than the contracted end, alined apertures 14 and 15, in which is arranged a bolt-like rod 16. The upper end 17 of the rod 16 is enlarged and has flattened sides 18 which protrude slightly beyond corresponding sides of the rod, as will appear from a consideration of Fig. 3 of the drawing. The end 17 has, centrally thereof, an aperture 19, in which a rivet pivot pin 20 is mounted. The pin is also mounted in apertures 21 on the forked end 22 of a cam and friction block or lock element 23. The apertures 21 are located in such position on the element 23 as to provide extensively bulging cam surfaces 24 on the forked ends 22. This surface, at its greatest distance from the pivot 21, extends into a slight flat, as at 25, note Fig. 1. The crosshead 26 of the element 23 has an aperture 27 therein opening outwardly through the crosshead to receive a reduced end 28 on an operating rod 29. The slightly reduced end 28 forms a shoulder 30 on the rod 29 which checks inward movement of the end 28 into the crosshead 26. The rod 29 is detachable with respect to the element 23 so that a single rod or tool can be used in conjunction with an unlimited number of the clamps in actuating the elements 23 to move the same from an inoperative to an operative position and vice versa. The rivet 20 is a loose rivet or, in other words, loosely headed bolt, so as to maintain the alinement of the parts while, at the same time, facilitating free movement of the elements 23 on the bolt or rivet 20.

The lower end portion of the rod 16 is threaded and a nut 31 is adjustable thereon and, when fixed to a predetermined adjustment, the nut is fixed in position as by spot welding at 32 to retain the same against movement. The purpose of the adjustment is to provide a predetermined spacing of the plates 10 and 11 one with respect to the other when in their extended, as well as in the clamping position and this variance would be with certain standard types and kinds of drums or drum rings, on which the clamp would be used. It will be understood, in this connection that, with one standard type of drum ring construction, all of the clamps employed will be of the same setting and these settings would preferably be fixed in the initial production of the clamp.

Figure 2:
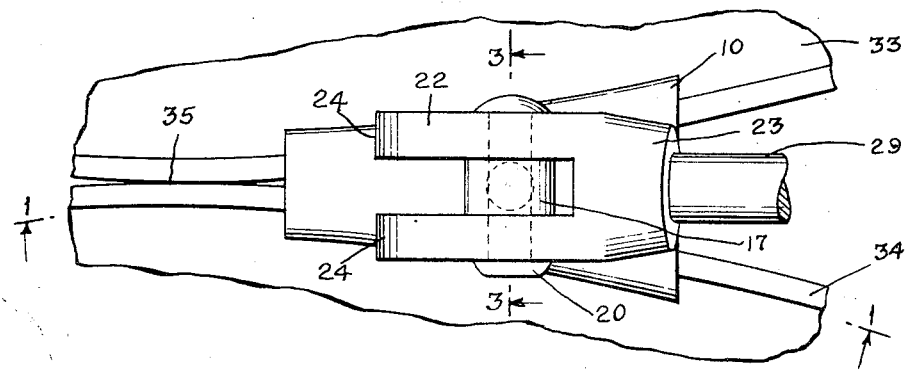
Fig. 2 is a plan view of the structure as seen in Fig. 1, illustrating a portion of two drum rings with the clamp mounted thereon.

To illustrate the use of the clamp, I have indicated in Figs. 2 and 3 of the drawing parts of two drum rings 33 and 34 and at 35 I have shown where the crosshead 33' and 34' of these rings abut. It will be noted from a consideration of Fig. 2 that the contracted ends of the plates are arranged in close proximity or in alinement with the abutment at 35, thus, when the clamp is in position, the two drums, of which the rings 33, 34 form a part, will be firmly clamped together.

In the nesting of a number of the drums to form a group, these clamps can be positioned in any desired manner on the drums of the group and, in some instances, two or more of the clamps will engage a single drum.

Figure 1:
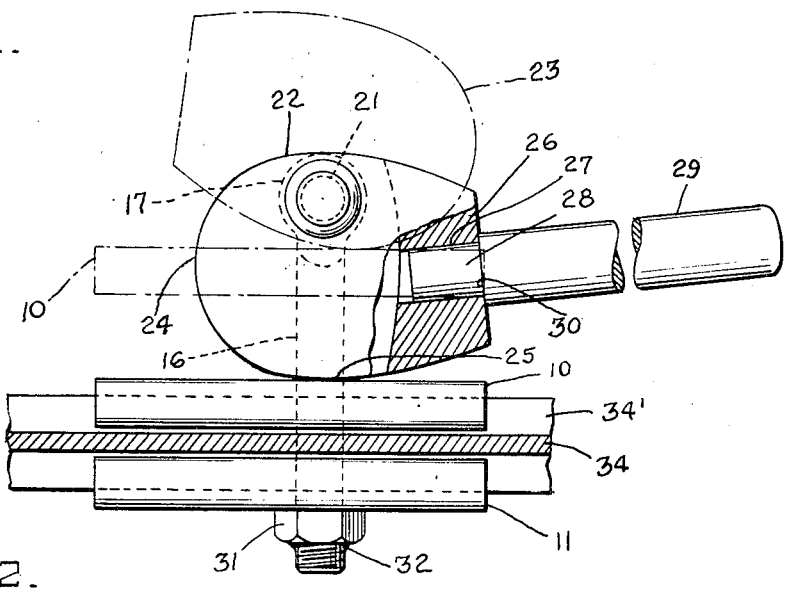
Fig. 1 is a side and sectional view of a clamp made according to my invention indicating the method of its use, with parts of the construction broken away and indicating parts in different positions in dotted lines, the section being substantially on the line 1—1 of Fig. 2.

In the use of the clamp, the element 23 is initially swung into the dotted line position shown in Fig. 1 of the drawing, which enables the top plate 10 to be moved relatively to the bottom plate 11 to the extent indicated in dotted lines in Fig. 1 and also indicated in Fig. 3 of the drawing. From this, it will be apparent that the plates can then easily be placed upon the adajcent rings 33, 34, even though these rings may not be in direct horizontal alinement with each other. When properly positioned, the top plate 10 is allowed to drop onto the crossheads 33', 34' of the rings, after which the rod or tool 29 is placed in the aperture or socket 27 of the unit 23 and the unit is then swung downwardly in the direction of the plate 10, the cam surfaces 24 forcing said plate 10 downwardly until the two rings 33, 34 have been brought into common alinement with each other and are securely gripped by the plates 10 and 11. On the completion of this operation, the surfaces 25 will engage the plate 10 and securely retain the unit 23 against accidental displacement or movement. After the clamp has been securely moved into position, the rod or tool 29 is withdrawn and the same is used for securing another clamp in position.

In separating the drums, the rod 29 is again placed in position and moved upwardly to disengage the unit 23 from the plate 10, allowing this plate to be moved upwardly to free the adjacent drums.

It will be apparent that, by virtue of the structural arrangement employer, the plates 10 and 11 become a unitary part of the remainder of the clamp, in that the nut 31 is securely fixed on the rod 16. This facilitates the handling of clamps of the kind under consideration and, by reason of the construction employed, drum ring clamps can be quickly and securely coupled and uncoupled. This eliminates the operation of nuts and bolts, as for example with the structure in my prior patent and also prevents separation of the plates of the clamp one from the other.

It will be understood that the present disclosure deals with one use of a clamping device of the kind under consideration. However, devices of this type and kind employing a rod-like part, having a pair of clamping members mounted thereon and retained against displacement from the part, wherein one end of the part has manually actuated means such as the lock element, with the means for coupling an operating tool therewith, can be utilized for securing articles or members of any type or kind together. In fact, the clamping device can be used to grip or engage a support for any purpose whatever.

Having fully described my invention, what I claim as new and desire to secure by Letters Patent is:

1. A clamp of the class described, comprising a pair of substantially V-shaped sheet metal plates having flanged sides and narrow and wide ends, the stock of the plates, including that in the flanges, being substantially of the same thickness throughout, said flanged sides forming, on adjacent surfaces of the plates, opposed channels extending the major portion of the width of said plates and extending from the narrow to the wide end thereof, a rod passing through aligned apertures in said plates, said rod having an enlarged apertured end, means fixed to the other end portion of the rod and arranged in close proximity to the adjacent plate when the clamp is in operative position for retaining the plates against displacement from said end portion, a pivot pin in the aperture of said enlarged end of the rod, a cam unit mounted on said pivot pin, said pivot pin and the central portion of the rod being substantially of the same thickness, said unit including a forked portion, within which the enlarged end of the rod is disposed, the forked portion of the unit including a crosshead having an aperture centrally thereof, in which an operating tool is adapted to be arranged to actuate said unit, and the cam portion of the unit operatively engaging one of the plates of a channel in moving the same in the direction of the other channel in movement of said channels into clamping engagement with predetermined curved relatively flaring workpieces arranged in the channels of said plates.

2. A clamp as defined in claim 1, wherein the enlarged end portion of said rod has flattened sides projecting beyond corresponding sides of the rod.

3. A unitary clamp device of the character described, comprising a rod having an enlarged end with large diameter pivot means extending at sides thereof, a cam-like element mounted on said pivot means, a pair of sheet metal channel-shaped clamping plates of common stock thickness throughout, said plates slidably engaging said rod, said plates having wide and narrow ends, the channels of said plates extending the major part of the plates from end to end, means, at the other end portion of the rod, for checking movement of the plates in the direction of said end of the rod, said element comprising a crosshead having forked ends, and said element having means, centrally of the crosshead, for coupling a tool therewith for actuating the element in movement thereof into operative and inoperative positions.

4. A structure as defined in claim 3, wherein said second named means comprises a part adjustable on the second named end of the rod and fixed in predetermined adjusted position thereon.

References Cited in the file of this patent
UNITED STATES PATENTS

| | | |
|---|---|---|
| 795,782 | Porter | July 25, 1905 |
| 1,397,290 | Nelson | Nov. 15, 1921 |
| 2,113,852 | Meade | Apr. 12, 1938 |
| 2,540,383 | Tillert | Feb. 6, 1951 |
| 2,615,219 | Imparato | Oct. 28, 1952 |
| 2,629,910 | Imparato | Mar. 3, 1953 |